April 16, 1968   N. L. LANKOW   3,378,726
SHOCKPROOF AUTO SEAT AND SEAT COVER
Filed June 6, 1966
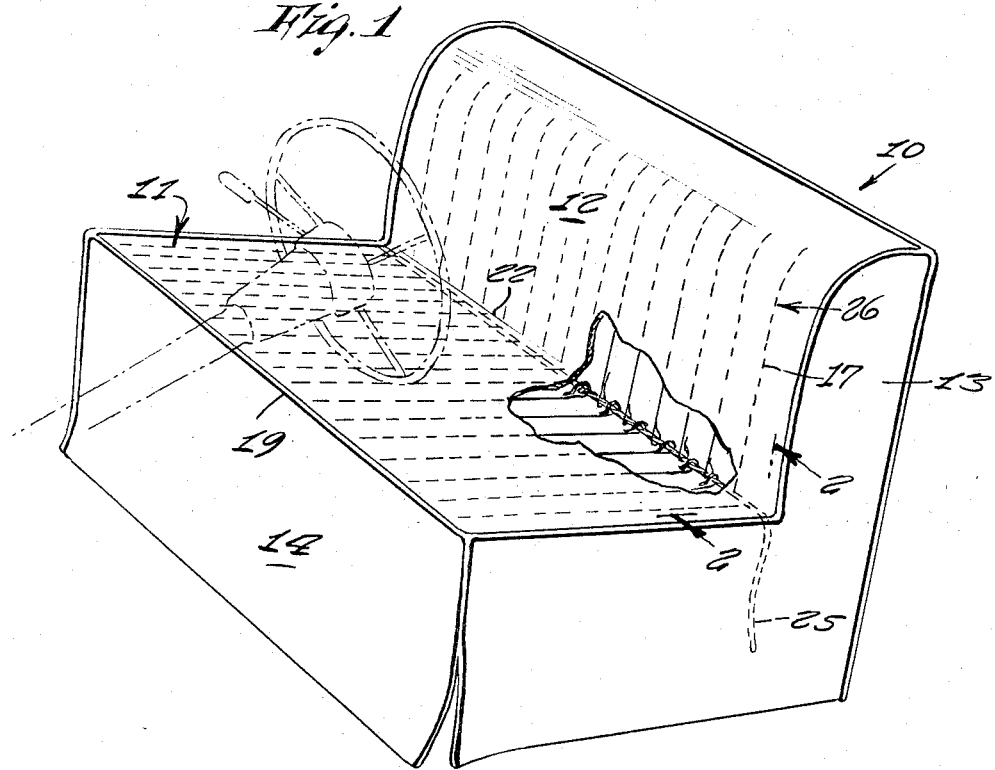
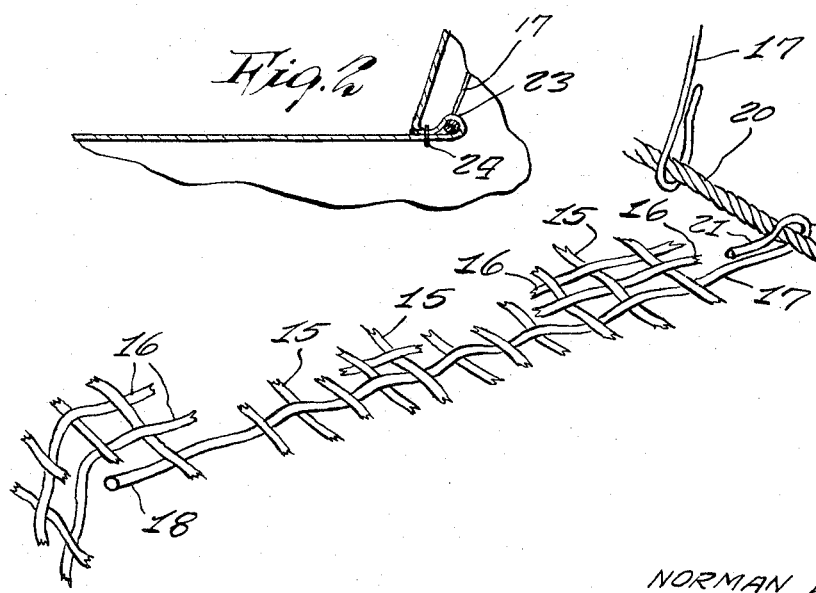
INVENTOR.
NORMAN L. LANKOW

United States Patent Office 3,378,726
Patented Apr. 16, 1968

3,378,726
SHOCKPROOF AUTO SEAT AND SEAT COVER
Norman L. Lankow, 320 N. Locust,
Vandalia, Ill. 62471
Filed June 6, 1966, Ser. No. 555,512
3 Claims. (Cl. 317—2)

ABSTRACT OF THE DISCLOSURE

A seat and seat cover for an automobile having a seat panel of woven fabric that is interwoven with metallic wire, the metallic wire being connected to a cable having an extending tail that is grounded to any metallic surface of the automobile, thus preventing the development of static electricity upon the seat which would otherwise cause a shock upon contact with a person.

This invention relates generally to automobile accessories. More specifically it relates to automobile seat covers.

It is generally well known to those given the art that there are times when a person's movements across a surface create the development of static electrical charge and when subsequently a person touches a metal object he is subject to a slight electrical shock. Such situation occurs occasionally upon a person sliding into an automobile seat and upon touching the door handle or steering wheel or metal other surface he is subject to a slight shock which is of course undesirable.

Accordingly it is a principal object of the present invention to provide an auto seat cover having self-contained means for preventing the build up of static electricity should a person slide thereupon.

Another object of the present invention is to provide an auto seat cover having a self-contained metallic grid woven thereinto, the grid having a lead extending therefrom to provide an electrical contact with any metallic part of the automobile.

Yet another object of the present invention is to provide an automobile seat cover having shock proof characteristics wherein the grid is comprised of a plurality of parallel spaced apart metallic thin wires which are woven into the seat portion of the seat cover and each of the wires are connected at one end to a common metallic cable, the end of which has means for being in contact with any metal surface of the automobile.

Other objects of the present invention are to provide a shockproof auto seat and seat cover which is simple in design, inexpensive to manufacture, rugged in construction, easy to use and efficient in operation.

These and other objects will be readily evident upon a study of the following specifications and accompanying drawing wherein:

FIGURE 1 is a perspective view of the present invention shown partly in cross-section so to more clearly illustrate the invention incorporated therein, FIGURE 2 is an enlarged cross-sectional view taken on the line 22 of FIGURE 1, and FIGURE 3 is an enlarged fragmentary perspective view showing a typical weave of the grid wire relative to the woof and warp threads woven together to form the seat cover seat portion.

Referring now to the drawing in detail the numeral 10 represents a shockproof automobile seat cover according to the present invention wherein there is a seat portion 11, a back rest portion 12, side flaps 13 and a front apron 14. The seat cover is fitted over an automobile seat in a conventional well-known manner. The seat cover may be made of any conventional material presently used which usually comprises a woven fabric made of material having characteristics making it readily washable so to remove spots therefrom.

In the present invention the seat 11 is woven to woof and warp threads 15 and 16 respectively as shown in FIGURE 3 of the drawing. A plurality of metallic wires 17 of relatively thin gauge are interwoven into the panel comprising the seat 11. The wire should preferably be woven so to cover all areas of the panel and as shown in FIGURE 1 of the drawing may thus be made to comprise a plurality of parallel wires 17 spaced approximately an inch or more apart. One end of the wire may terminate adjacent the front edge 19 of the seat cover. The end 18 of this wire is illustrated in FIGURE 3 wherein it is shown that the remaining other threads of the seat cover may continue downwardly past the edge 19 to form the apron 14 if so preferred. The opposite end of the wires 17 are made to come into electrical contact with a cable 20 extending transversely to the parallel wires 17. The contact of the ends 21 of the wire 17 with the cable 20 is accomplished by simply folding over the seat material along its rear edge 22 to form a loop 23 within which the cable 20 is placed and retained by a stitching 24. It will now be readily evident that due to the weave of the wires 17 into the seat panel 11 that bodily contact can be made directly with the surface of the wires 17, thereby permitting electrical charge from a person's body to be transmitted directly thereto. One or both ends of the cable 20 as shown at 25 may be made to extend for a relatively short length and to be firmly attached to any metallic surface of the lower portion of the seat structure. Thus electrical charges may be carried from the wires 17 through the cable 20 to the automobile metallic structure.

As shown in the drawing, another grid 26 comprised of metallic wires 17 is located in the back rest 12, the wires of which are also connected electrically to the cable 20.

In operative use a person may frictionally slide upon the seat without the possibility of static electrical charge being developed and retained.

The invention as above described for automobile seat covers may obviously likewise be incorporated into the panel forming an automobile seat whereby the same privileges may be obtained by persons who do not employ seat covers within their automobiles.

While various changes may be made in the detail construction it is understood that such changes will be within the spirit and scope of the present invention as defined by the appended claims.

What I claim is:

1. In a shockproof automobile seat and seat cover, the combination of a seat panel, a backrest, said backrest extending upwardly adjacent the rear edge of said seat panel, a front apron, said apron depending downwardly and the upper edge of said apron being adjacent the forward edge of said seat panel, and a pair of opposite side panels, said seat panel having self-contained means for receiving and transmitting electrical charge from a sliding body thereupon, and means for transmitting said electrical charge to a metallic surface of an automobile, said seat panel comprising a woven fabric having interwoven therein metallic wire means for receiving electrical charge, said wire means being available to be contacted by an object or body sliding upon the upper surface of said seat panel, said wire means comprising a grid, said grid comprising a plurality of parallel wires spaced equally apart and extending from forward edge of said forward seat panel to the rear edge of said seat panel and means for collecting electrical charge from all of said wires, the rear edge of said seat panel being folded over a transverse extending metallic cable, said folded over rear edge of said seat panel forming a loop receiving said cable therewithin, said loop being stitched to retain said cable within electrical contact with each of said wires to transmit electrical charge from said wires to said transverse electrical cable.

2. The combination as set forth in claim 1 wherein the ends of said transverse cable are extended to provide a means for firmly connecting to any metal surface of an automobile.

3. The combination as set forth in claim 2 wherein a grid is provided within said back rest, said back rest grid being similar to said grid of said seat and said backrest grid being likewise electrically connected to said metallic cable.

References Cited
UNITED STATES PATENTS

| | | | |
|---|---|---|---|
| 2,714,181 | 7/1955 | Azbill | 317—2 |
| 2,751,523 | 6/1956 | Adams | 317—2 |
| 2,802,148 | 8/1957 | Allder | 317—2 |
| 2,858,482 | 10/1958 | Nutter | 317—2 |
| 3,296,490 | 1/1967 | Price | 317—2 |

MILTON O. HIRSHFIELD, *Primary Examiner.*

J. A. SILVERMAN, *Assistant Examiner.*